United States Patent
Jia et al.

(10) Patent No.: US 7,417,751 B2
(45) Date of Patent: Aug. 26, 2008

(54) SCANNING TO STORAGE MEDIUM USING SCANNING DEVICE

(75) Inventors: Charles Jia, San Diego, CA (US); Laura Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1057 days.

(21) Appl. No.: 10/639,025

(22) Filed: Aug. 12, 2003

(65) Prior Publication Data

US 2005/0036165 A1 Feb. 17, 2005

(51) Int. Cl.
- *G06F 13/00* (2006.01)
- *G06F 3/12* (2006.01)
- *H04N 1/04* (2006.01)
- *H04N 1/21* (2006.01)

(52) U.S. Cl. ............ 358/1.13; 358/1.16; 358/444; 358/474

(58) Field of Classification Search ........... 358/472, 358/474, 1.16, 1.18, 1.13, 444
See application file for complete search history.

(56) References Cited

U.S. PATENT DOCUMENTS

| | | | |
|---|---|---|---|
| 4,055,835 A * | 10/1977 | Thornton et al. | 379/165 |
| 5,306,908 A | 4/1994 | McConica et al. | |
| 5,381,020 A | 1/1995 | Kochis et al. | |
| 5,485,245 A * | 1/1996 | Kobayashi et al. | 399/1 |
| 6,289,140 B1 | 9/2001 | Oliver | |
| 6,588,664 B2 * | 7/2003 | Davies | 235/462.01 |
| 7,059,785 B2 * | 6/2006 | Kato et al. | 400/62 |
| 2003/0107762 A1 * | 6/2003 | Kinoshita et al. | 358/1.15 |
| 2004/0130732 A1 * | 7/2004 | Denpo | 358/1.1 |
| 2004/0201774 A1 * | 10/2004 | Gennetten | 348/375 |

* cited by examiner

*Primary Examiner*—Houshang Safaipour

(57) ABSTRACT

A scanning device of one embodiment of the invention is disclosed that includes a scanning mechanism and a removable storage media mechanism disposed within a housing of the scanning device. The scanning mechanism is to scan image data from scannable media. The removable storage media mechanism is receptive to a removable storage medium on which the image data scanned from the scannable media is stored.

13 Claims, 3 Drawing Sheets

SCANNING TO STORAGE MEDIUM USING SCANNING DEVICE

BACKGROUND

The manipulation of images has become a popular utilization of computing devices. The images may be captured by using digital cameras, or by using scanning devices, such as standalone scanners and multi-function devices (MFD's) having scanning capability. MFD's are also commonly referred to as all-in-one (AIO) devices, or AIO's. Both digital cameras and scanning devices are commonly connectable to host computing devices, to download the images that have been captured.

Further, digital cameras commonly store their images on removable storage media, such as flash memory cards, that are removably insertable into the cameras. Printing devices, such as inkjet printing devices, have increasingly been able to have such removable storage media inserted in them, too. This means that a user can capture images with a digital camera, remove the removable storage medium from the camera, and insert the medium into a printer to print hardcopies of images, without having to use a host computing device, such as a desktop or a laptop computer. Not having to use a host computing device can make printing hardcopies of images captured with a digital camera more convenient for an end user.

However, users of scanning devices usually cannot enjoy this convenience. Rather, they are typically limited to scanning images to a host computing device before, for instance, printing hardcopies of the images with a printing device. As such, scanning devices are generally not as convenient as other devices that allow users to capture images.

SUMMARY OF THE INVENTION

A scanning device of one embodiment of the invention includes a scanning mechanism and a removable storage media mechanism. The scanning mechanism is to scan image data from scannable media, and is disposed within a housing of the device. The removable storage media mechanism is also disposed within the housing of the device, and is receptive to a removable storage medium on which the image data scanned from the scannable media is stored.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
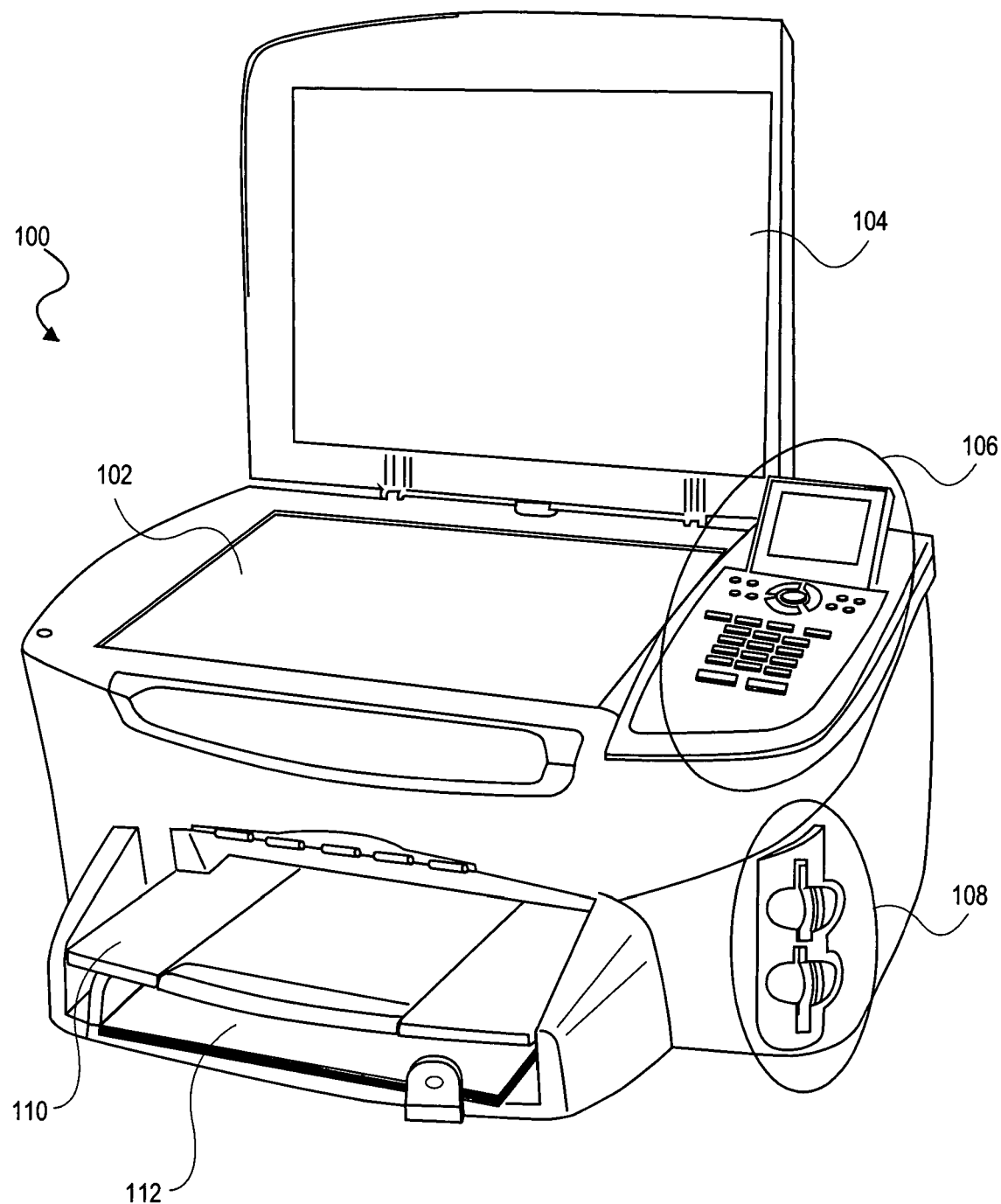
FIG. 1 is a diagram of a representative scanning device, according to an embodiment of the invention.

FIG. 1 shows a representative scanning device 100, according to an embodiment of the invention. The scanning device 100 is particularly a multi-function device (MFD), which is also known as an all-in-one (AIO) device, or an AIO. An MFD or an AIO is a device that can perform more than one function. For instance, the scanning device 100 is able to scan image data from scannable media, and print image data to print media. The scannable media is any type of media that is capable of being scanned, such as documents, photographs, and so on. The print media is any type of media that is capable of being printed on, such as paper, transparencies, and so on. The scanning device 100 may also be able to copy scannable media to print media, by first scanning scannable media as image data, such as by scanning the scannable media as rows of digital image data, and then printing the image data onto print media. The printing may start as soon as one or more rows of the image data have been scanned, and before, for instance, the entire scannable media has been scanned. The scanning device 100 may also be able to send faxes, by scanning scannable media as image data and faxing the resulting image, and to receive faxes, by receiving a fax as image data, as well as other information, such as a timestamp, identification of the fax sender's station, and so on, which may then be printed.

The scanning device 100 has a scanning mechanism that includes a scanning glass 102 and a closable lid 104. The scanning mechanism is disposed within the housing of the scanning device 100. Scannable media is placed on the scanning glass 102, and preferably the closable lid 104 is closed before scanning begins. The scanning mechanism may also include an automatic document feeder (ADF), so that users do not have to manually position each sheet of a number of sheets of media on the scanning glass 102. The scanning device 100 has a printing mechanism that includes an output tray 110 on which print media is output after being printed, and an input tray 112 from which print media is supplied for printing. The scanning device 100 also includes a user-interface mechanism 106 and a removable storage media mechanism that includes one or more removable storage media slots 108 that are receptive to insertion of removable storage media, such as flash memory cards in varying form factors. The user-interface mechanism 106 and the removable storage medium mechanism are also both disposed within the housing of the device 100. Examples of such cards include Compact Flash (CF) cards, Secure Digital (SD) cards, MultiMedia Cards (MMC's), SmartMedia cards, and Memory Sticks, among others. The scanning of scannable media results in image data that can be stored on a removable storage medium inserted into one of the slots 108, or directly sent back to a host computing device, such as a host personal computer (PC) like a desktop computer or a laptop computer.

The user-interface mechanism 106 includes both a number of controls and a display with which the scanning device 100 is able to interact with a user. The display can display to the user status and other information regarding the job that the scanning device 100 is currently performing. The user can configure the scanning device 100 using the controls, and can also perform other functionality using the controls. For instance, for image data scanned from scannable media, the user may able to enter meta data regarding the image data, to be stored on the removable storage medium along with the image data. The meta data may include whether the image data is to be printed on print media, the sizing of the image on the print media, a caption for the image data, as well as other printing parameters and other information. The meta data may be stored with the image data in accordance with the Exchangeable Image File Format (EXIF).

The scanning device 100 is a standalone-capable device that can be used without being communicatively connected to a host computing device, such as a desktop computer or a laptop computer. In particular, scannable media can be scanned as image data that is stored on a removable storage medium. The user may then remove the removable storage medium from the scanning device 100, and, for example, insert it into a corresponding slot of a printing device for printing hardcopies of the image data, without having to use a host computing device. The removable storage medium may also be used for other purposes, such as to share the image data with other users, to insert into a corresponding slot of a display device to electronically display the image data, and so on. The ability of the scanning device 100 to scan image data from scannable media directly to storage media, without using a host computing device, thus allows for more convenient scanning by users.

Scanning Device and Method

Figure 2:
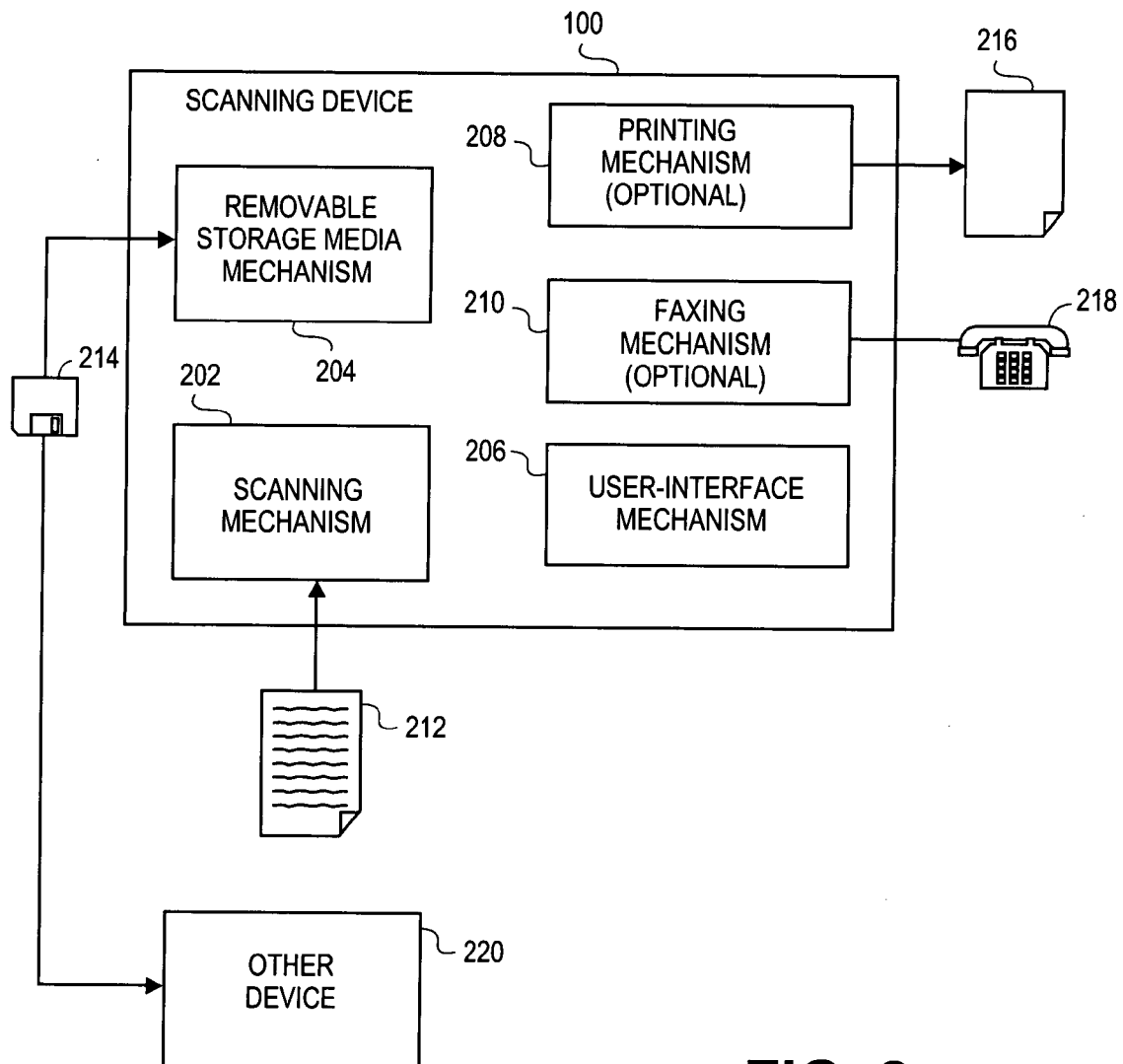
FIG. 2 is a block diagram of a scanning device, according to an embodiment of the invention.

FIG. 2 shows the scanning device 100, according to an embodiment of the invention. The scanning device includes a scanning mechanism 202, a removable storage media mechanism 204, and a user-interface mechanism 206. All of the mechanisms 202, 204, and 206 are disposed within a housing of the scanning device. The scanning device optionally includes a printing mechanism 208 and/or a faxing mechanism 210. Where either or both of the mechanisms 208 and 210 are included, the scanning device is a multi-function device (MFD). Moreover, the scanning device is a standalone-capable device, such as a standalone-capable scanner or a standalone-capable MFD, in that it can be used without being communicatively connected to a host computing device.

The scanning mechanism 202 includes the hardware and/or software that enables scannable media 212 to be scanned in as image data. The scanning mechanism 202 may be a color scanning mechanism and/or a black-and-white scanning mechanism. The removable storage media mechanism 204 includes the hardware and/or software that enables the image data to be saved onto a removable storage medium 214 inserted into the removable storage media mechanism 204. The removable storage media mechanism 204 may include one or more slots into which the removable storage medium 214 can be inserted. The removable storage medium 214 may be a semiconductor medium, such as a flash memory card or another type of removable storage media card, a magnetic medium, such as a floppy disk or a tape or tape cartridge, an optical medium, such as a CD-R, CD-RW, or a writable or rewritable DVD, or another type of medium.

The user-interface mechanism 206 includes the hardware and/or software that allows a user to interact with the scanning device 100. The user-interface mechanism 206 may include a display and one or more controls. The user may be able to enter meta data for the image data stored on the removable storage medium 214 using the user-interface mechanism 206, for instance. For the scannable media 212 scanned in as image data, the meta data may be stored on the removable storage medium 214 in the same file as the image data, or in a different file as compared to the file in which the image data is stored.

The printing mechanism 208 includes the hardware and/or software that enables image data, such as the image data resulting from the scannable media 212 being scanned as stored on the removable storage medium 214, to be output onto printable media 216. The printing mechanism 208 may be an inkjet-printing mechanism, a laser-printing mechanism, or another type of printing mechanism. The faxing mechanism 210 is communicatively coupled to a telephone line 218, and includes the hardware and/or software that enables image data as scanned by the scanning mechanism 202 from the scannable media 212 to be transmitted as a fax. The hardware and/or software may also additionally or alternatively enable faxes to be received and stored within memory of the device 100, and then further transferred to the removable storage medium 214, or back to the host computing device upon connection to the host computing device.

The removable storage medium 214 is removable from the removable storage media mechanism 204 of the scanning device 100. As such, the removable storage medium 214 may be inserted into another device 220. The device 220 may be a display device to display the image data stored on the removable storage medium 214, a fax device to fax the image data stored on the medium 214, a printing device to print the image data, a computing device to process the image data, or another type of device.

Figure 3:
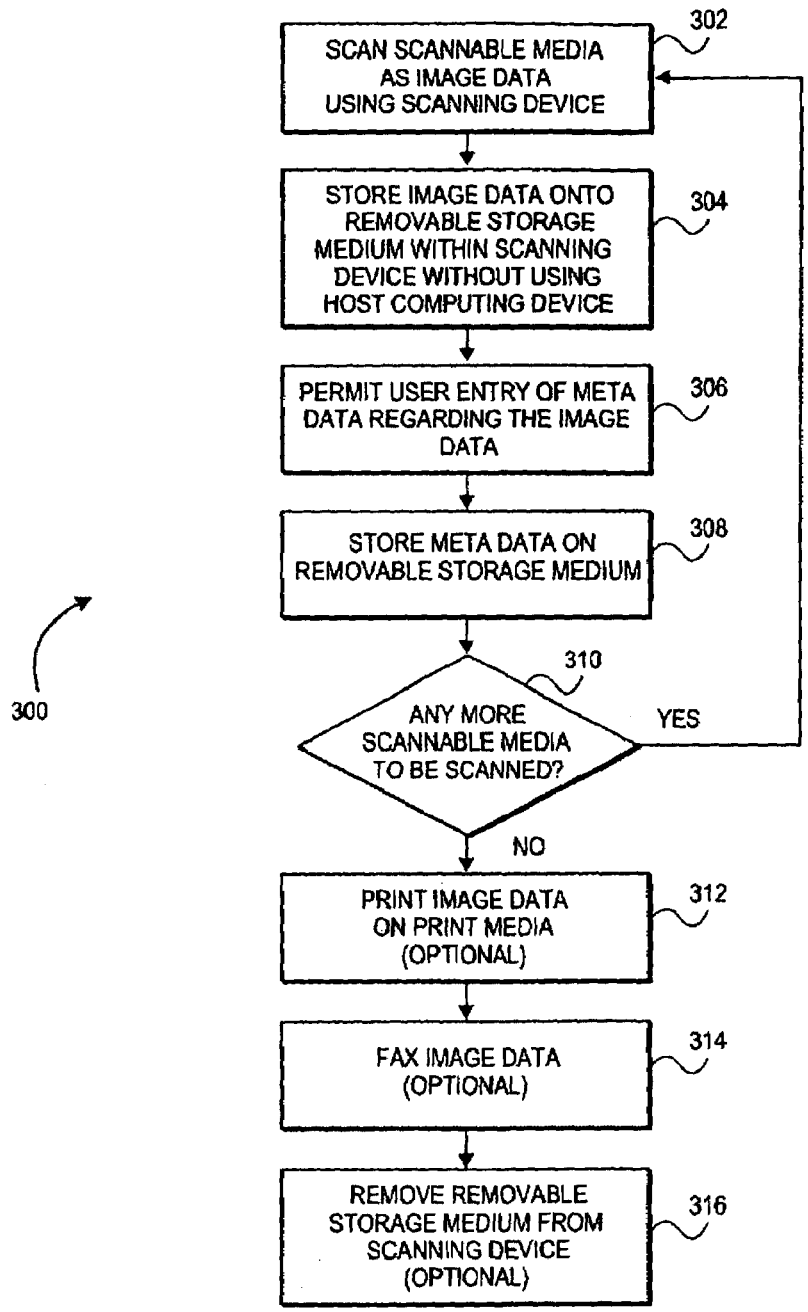
FIG. 3 is a flowchart of a method, according to an embodiment of the invention.

FIG. 3 shows a method of use 300, according to an embodiment of the invention. The scannable media 212 is scanned as image data using the scanning mechanism 202 of the scanning device 100 (302). The resulting image data is stored onto the removable storage medium 214, without using a host computing device (304). The user is preferably afforded an opportunity to enter meta data regarding the image data where appropriate (306), via the user-interface mechanism 206. The meta data is also stored on the removable storage medium 214 (308). If the user has more scannable media to scan (310), then 302, 304, 306, and 308 are repeated as necessary for the additional scannable media, resulting in additional image data stored on the removable storage medium 214.

Once there is no more scannable media within a given scanning job to scan (310), then the image data that has been stored on the removable storage medium 214 may be optionally printed where the scanning device 100 includes the printing mechanism 208 (312). The image data may also optionally be faxed where the scanning device 100 includes the faxing mechanism 210 (314). The user may then remove the removable storage medium 214 from the scanning device 100 (316) to, for instance, insert the medium 214 into the other device 220.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A scanning device comprising:
   a housing;
   a scanning mechanism disposed within the housing to scan image data from scannable media; and,
   a removable storage media mechanism also disposed within the housing and receptive to a removable storage medium on which the image data scanned from the scannable media is stored,
   such that the housing within which the scanning mechanism is disposed is a same housing within which the removable storage media mechanism is disposed,
   wherein the removable storage medium also stores meta data regarding the image data, and
   wherein the meta data comprises printing parameters for the image data, the printing parameters comprising whether the image data is to be printed on print media.

2. The scanning device of claim 1, wherein the image data is scannable from the scannable media and storable on the removable storage medium without the scanning device communicatively coupling to a host computing device.

3. The scanning device of claim 1, wherein the scanning mechanism comprises at least one of a color scanning mechanism and a black-and-white scanning mechanism.

4. The scanning device of claim 1, wherein the removable storage media mechanism comprises at least one removable storage media slot, each slot receptive to a removable storage media card.

5. The scanning device of claim 1, further comprising a user-interface mechanism via which a user is able to enter the meta data regarding the image data.

6. The scanning device of claim 1, wherein the meta data is stored with the image data as a single file on the removable storage medium.

7. The scanning device of claim 1, wherein the meta data is stored on the removable storage medium as a first file and the image data is stored on the removable storage medium as a second file.

8. The scanning device of claim 1, further comprising a printing mechanism to print images on print media.

9. The scanning device of claim 8, wherein the image data scanned from the scannable media is printable on the print media by the printing mechanism.

10. The scanning device of claim 8, wherein the printing mechanism is one of a laser-printing mechanism and an ink-jet-printing mechanism.

11. The scanning device of claim 1, farther comprising a faxing mechanism to fax the image data scanned from the scannable media and to receive faxes.

12. The scanning device of claim 11, wherein the faxes are storable as fax image data on the removable storage medium.

13. The scanning device of claim 1, wherein the scanning device is one of a standalone-capable scanner and a standalone-capable multi-function device (MFD).

* * * * *

UNITED STATES PATENT AND TRADEMARK OFFICE
CERTIFICATE OF CORRECTION

PATENT NO.       : 7,417,751 B2                                Page 1 of 1
APPLICATION NO.  : 10/639025
DATED            : August 26, 2008
INVENTOR(S)      : Charles Jia et al.

It is certified that error appears in the above-identified patent and that said Letters Patent is hereby corrected as shown below:

In column 6, line 19, in Claim 11, delete "farther" and insert -- further --, therefor.

Signed and Sealed this

Eighteenth Day of November, 2008

JON W. DUDAS
*Director of the United States Patent and Trademark Office*